United States Patent
Van Hamme et al.

(10) Patent No.: US 9,427,907 B2
(45) Date of Patent: Aug. 30, 2016

(54) METHOD AND DEVICE FOR TRANSPORTING PREFORMS

(71) Applicant: KHS Corpoplast GmbH, Hamburg (DE)

(72) Inventors: Thomas Van Hamme, Kisdorf (DE); Frank Haesendonckx, Hamburg (DE); Matthias Grunwald, Hamburg (DE); Thorsten Herklotz, Ahrensburg (DE)

(73) Assignee: KHS CORPOPLAST GMBH, Hamburg (DE)

( * ) Notice: Subject to any disclaimer, the term of this patent is extended or adjusted under 35 U.S.C. 154(b) by 0 days.

(21) Appl. No.: 14/808,778

(22) Filed: Jul. 24, 2015

(65) Prior Publication Data

US 2016/0023397 A1 Jan. 28, 2016

(30) Foreign Application Priority Data

Jul. 25, 2014 (DE) .................. 10 2014 010 862

(51) Int. Cl.
  *B65G 43/08* (2006.01)
  *B29C 49/42* (2006.01)
  *B29C 49/78* (2006.01)
  *B29C 49/02* (2006.01)
  *B29K 105/00* (2006.01)

(52) U.S. Cl.
  CPC .......... *B29C 49/4205* (2013.01); *B29C 49/78* (2013.01); *B65G 43/08* (2013.01); *B29C 2049/024* (2013.01); *B29C 2049/4231* (2013.01); *B29K 2105/258* (2013.01); *B65G 2811/0673* (2013.01)

(58) Field of Classification Search
  CPC .......................... B65G 43/08; B29C 49/4205
  See application file for complete search history.

(56) References Cited

U.S. PATENT DOCUMENTS

| | | | | |
|---|---|---|---|---|
| 3,817,368 A * | 6/1974 | Wentz | .................. | B65G 47/52 198/357 |
| 4,223,778 A | 9/1980 | Kontz | | |
| 4,356,907 A | 11/1982 | Aidlin | | |
| 6,023,034 A * | 2/2000 | Nakajima | .............. | B65H 29/00 198/460.1 |
| 6,334,767 B2 * | 1/2002 | Kieras | .................... | B29C 43/36 264/132 |
| 7,399,435 B2 * | 7/2008 | Dunzinger | ............. | B29C 49/80 264/234 |
| 8,167,111 B2 * | 5/2012 | Asman | .................. | B65G 43/08 198/349.95 |

(Continued)

FOREIGN PATENT DOCUMENTS

DE 102009016593 A1 10/2010
DE 102009040803 A1 4/2011

(Continued)

*Primary Examiner* — Thomas Randazzo
(74) *Attorney, Agent, or Firm* — Lucas & Mercanti, LLP; Klaus P. Stoffel

(57) ABSTRACT

A method for transporting preforms in the area of a machine for blow-molding thermoplastic containers along a sorting device configured as a roll sorter. A sensor arranged at the sorting device senses a preform passing through its detection area and generates a sensor signal that transmitted to a control system, which evaluates the sensor signal and generates a control signal as a function thereof. A process parameter of the sorting device and/or of a conveying device upstream of and supplying preforms to the sorting device is adjusted as a function of at least one of the control signals. A sensor senses a section of the sorting device and generates a signal that contains data on a gap between a pair of preforms being transported successively passed this sensor. The control signals for adjusting a process parameter of the conveying device and/or of the sorting device are dependent on gap data.

12 Claims, 2 Drawing Sheets

(56) References Cited

U.S. PATENT DOCUMENTS

| | | | |
|---|---|---|---|
| 8,490,797 B2 | 7/2013 | Tanner | |
| 8,783,469 B2 * | 7/2014 | Beutl | B29C 49/4205 209/522 |
| 8,813,944 B2 * | 8/2014 | Tanner | B65G 47/256 198/389 |
| 9,199,405 B2 * | 12/2015 | Heller | B29C 49/4205 |
| 2001/0048953 A1 * | 12/2001 | Kieras | B29C 66/3712 425/392 |
| 2011/0120833 A1 | 5/2011 | Tanner | |
| 2012/0226376 A1 | 9/2012 | Haesendonckx et al. | |
| 2015/0151457 A1 * | 6/2015 | Heller | B29C 49/4205 198/345.1 |
| 2015/0151478 A1 * | 6/2015 | Heller | B29C 49/4205 425/139 |
| 2015/0191269 A1 * | 7/2015 | Siegl | B29B 11/08 215/44 |
| 2015/0231814 A1 | 8/2015 | Seger et al. | |

FOREIGN PATENT DOCUMENTS

| | | |
|---|---|---|
| DE | 102013218391 A1 | 3/2015 |
| EP | 2578504 A1 | 4/2013 |
| EP | 2910500 A1 | 8/2015 |
| WO | 2010006461 A1 | 1/2010 |

* cited by examiner

METHOD AND DEVICE FOR TRANSPORTING PREFORMS

CROSS-REFERENCE TO RELATED APPLICATIONS

The present application claims priority of DE 10 2014 010 862.7, filed Jul. 25, 2014, the priority of this application is hereby claimed and this application is incorporated herein by reference.

BACKGROUND OF THE INVENTION

The present invention pertains to a method for transporting preforms in the area of a blow-molding machine for the blow-molding of containers of thermoplastic material along a sorting device configured as a roll conveyor with two rotating, in particular counter-rotating, conveying rolls; to a device for controlling a method for transporting preforms in the area of a blow-molding machine; and to a device for the blow-molding of containers of thermoplastic material.

So that preforms can be fed to a blow-molding machine, the preforms are typically transported along a slide rail with their openings facing upward. The preforms are guided and supported typically by support rings, which are arranged underneath the threads of the preforms. These support rings are also called neck rings. The slide rail is usually arranged with a steep downward slant toward the blow-molding machine, so that a back pressure develops in the row of transported preforms.

To ensure that blow-molding machines with high production capacity can be supplied reliably with preforms, relatively long slide rails are used to achieve an adequate back pressure of the preforms in the entrance area to the blow-molding machine in spite of the frictional forces which occur during the movement of the preforms along the slide rails.

To singulate and sort the preforms, a roll conveyor can be installed upstream of the slide rail. An ascending conveyor is typically installed upstream of the roll conveyor. The ascending conveyor accepts preforms from a supply container or silo, conveys them upward, and transfers them, unsorted and unoriented, to the roll conveyor. The ascending conveyor usually operates on the principle of a conveyor belt.

The roll conveyor singulates and sorts the unorganized preforms. The roll conveyor orients the preforms, so that they can be suspended by their support rings between two approximately parallel rolls and can be moved forward in a row, with their openings facing upward, in the longitudinal direction of the conveying rolls. The roll conveyor is arranged at an angle and extends from the ascending conveyor down toward the slide rail, so that the preforms slide along the slanted rolls by the force of gravity toward the slide rail. By the time they reach the end of the roll conveyor, the preforms are oriented with their openings facing upward and are arranged in a row, one behind the other, so that they can be transferred to the slide rail in orderly fashion.

During the transport of the preforms within the roll conveyor, gaps occur, which must be filled by the time the preforms reach the blow-molding machine, so that there will not be any interruption in the feed to the machine. For this purpose, it is known that, for example, a queue brake arranged in the area of the roll conveyor can produce additional back pressure in the row of preforms, so that the incoming preforms can slide forward and fill the gap.

So that the gaps can be filled at an early point by active control of the transport device or roll conveyor, the gaps must first be detected reliably. It is known from the prior art that gaps can be detected by means of a time-resolved measurement. For this purpose, light barrier sensors are typically placed at a few separate locations. The beam paths of the light barriers typically pass through the intermediate space between the conveying rollers more-or-less crosswise to the longitudinal direction of the rollers. As soon as a preform being transported between the conveying rollers interrupts the light barrier, the light barrier sensor generates a signal. Gaps between the transported preforms are recognized when no preform is detected at the individual position in question for a certain period of time.

The disadvantage of the prior art described above is that the light barriers monitor only certain individual positions, and any gaps which may be present outside these monitoring positions are not recognized at all or only after a considerable delay. As a result, supply fluctuations occur in the transport process, which can lead to control deviations. This can then lead in turn to the danger of interruptions in the sorting stream and to interruptions in the operation of the blow-molding machine.

SUMMARY OF THE INVENTION

The goal of the present invention is to provide a method and devices which improve the transport of the preforms as they are being fed to the blow-molding machine.

According to the invention, a method for transporting preforms in the area of a blow-molding machine for the blow-molding of containers of thermoplastic material along a sorting device configured as a roll conveyor with two rotating, in particular counter-rotating, conveying rolls is provided, in which at least one sensor arranged in the area of the sorting device senses at least one preform as it is being transported through its detection area and generates a sensor signal. The sensor signal is transmitted for processing to a control system, which evaluates the sensor signal and generates at least one control signal as a function thereof. A process parameter of the sorting device and/or of a conveying device upstream of the sorting device for supplying preforms to the sorting device is adjusted as a function of at least one of the control signals. At least one of the sensors senses a section of the sorting device, and the sensor signal of this sensor contains data on at least one gap between a pair of preforms being transported successively in the detection area of this sensor. The control signals for adjusting a process parameter of the conveying device and/or of the sorting device are dependent, at least for certain periods of time, on the gap data. An important aspect of the invention is the open-loop or closed-loop control of a transport stream of preforms along the sorting device, based on the knowledge obtained from the detection of the positions of the preforms as they are being transported in a row. According to the invention, the preforms are transported between the conveying rolls of a roll sorter, wherein at least some of the sections of the transport route along the conveying rolls of the roll sorter are monitored by section-detecting sensors.

According to the invention, it is provided that the sensor signals of at least some of the sensors assigned to specific sections are transmitted to a control system. This transmission can be achieved in hard-wired or wireless fashion. In the case of wireless transmission, optical or radio wave transmission, for example, can be considered.

For the sectional monitoring of the transport route, it is provided that at least one sensor assigned to a specific section mechanically detects and measures an elongated section of the row of preforms and, in the course of the measurement, delivers gap information pertaining to at least one pair of successively transported preforms. By means of sensors of this type, it is also possible to recognize the end of a row of preforms. Thus, not only data on the gaps between pairs of successive preforms but also data on the end of a moving chain of successively transported preforms can be acquired. In the past, the end of a row of preforms was detected by means of sensors which detected only individual points. Light barriers were normally used for this. When the preform passed through the light barrier, a sensor signal was generated, and it could thus be determined that a preform was in the area of the light barrier. During the time that the light barrier was not interrupted by a preform, it was therefore possible for either the end of the row or a gap between two successive preforms to be present in the area of the light barrier. On the basis of the time difference between two detected preforms and with knowledge of the transport speed, this known system made it possible to calculate the gap between two successive preforms.

By means of the method according to the invention, gaps between preforms can be detected much more quickly and comprehensively than before. If a camera sensor, for example, is used as the section-sensing sensor, both the position of the gap and the size of the gap between successive preforms can be acquired with a single measurement. According to the invention, therefore, even several gaps between different pairs of successive preforms can be detected with a single measurement. The data can be subjected to further processing for the open-loop or closed-loop control of the transport route.

An important aspect of the present teaching is that the sensors according to the invention deliver gap data even on the basis of a single measurement. Continuous gap detection is thus made possible. The detection of a gap is not carried out, as in the past, as a function of time but rather as a function of distance ranges or area ranges.

With respect to the present invention, the concepts of "closed-loop control" and the concepts of "open-loop control" are used by way of example in the previous discussion and also in the following. In principle, any of the processes called "closed-loop control" can also be realized as "closed-loop control", and any of the processes called "closed-loop control" can be realized in a simplified embodiment as "open-loop control". It is also possible, in the case of the sequence of steps explained in the context of open-loop control, to implement closed-loop control additionally, or, in the case of the processes explained in the context of closed-loop control, to implement open-loop control additionally.

In the present invention, the section-sensing sensors are preferably used to monitor the gap position and/or gap size between successive preforms. The detection is preferably carried out in the feed section and/or in the orientation section and/or in the quieting section of the transport route of the preforms. The sensor signals are preferably transmitted to a control system, and control signals are generated in order to adapt process parameters of the conveying and/or sorting devices. One goal of this process parameter adjustment is to fill the sensor-detected gaps as quickly as possible. The goal can also be, upon the detection of too few gaps or gaps which are too small, to reduce the incoming supply of new preforms. By means of this gap detection and evaluation, it is possible to control the preform density or preform concentration at least in the sorting device.

By means of the method proposed according to the invention and the devices according to the invention, the preforms can be sorted with much less fluctuation. In addition, the continuity with which the preforms are transported, especially at the entrance to the feed section, is promoted, and a more stable behavior during start/stop situations can be achieved.

The rapid and efficient control of preform transport can be promoted in that the control system generates at least some control signals for the adjustment of process parameters of the conveying device and/or of the sorting device by the use of a simulation model and/or a fuzzy logic.

Standard controllers such as PID controllers usually require the input of a mathematical model of the system to be controlled. For many applications, the complexity of the system makes it impossible to derive an adequate mathematical model or perhaps even impossible to derive one at all. Simplified models are often insufficient and lead to unusable controller results. By means of a fuzzy-logic controller, which operates on the principle of fuzzy logic, control circuits can be provided which yield good controller results in spite of the absence of a mathematical model or in spite of an inadequate one.

The use of fuzzy logic is based, among other things, on the definition and processing of rules or so-called "expert knowledge". Normally, the expert knowledge is in the form of linguistically formulated rules, most of which comprise a certain vagueness. The rules can contain statements, for example, which apply only when certain conditions are present.

When they are to be used for controlling a system, the rules can be usefully linked with logical operations such as AND/OR. By means of an efficient selection of rules and the meaningful linkage of these rules on the basis of, for example, sensor-detected measurement variables of a system, default values can be provided, which can be further processed for the effective adjustment or change of process parameters. With this goal in mind, it is possible for example, to link logically the sensor-detected gap size with other process parameters such as the transport speed of the ascending conveyor, the roll speed of a roll conveyor, or the desired production rate of the blow-molding machine in order to generate presets for the adjustment of individual process parameters of the transport system.

The use of a simulation model and/or of a fuzzy logic makes it possible to adjust the process parameters in such a way as to optimize the transport process in an extremely robust and efficient manner.

To ensure the rapid correction and/or quieting of disturbances which may occur in the form of, for example, gaps in the area of the transported preforms, it can be provided that a simulation model simulates the physical sequences of the transport process. The simulation model can in particular be in the form of a system model which models the real transport system. When a simulation model is used, variables of state such as gaps between successive preforms are measured and compared with simulated variables of state; and a difference between the real system and the simulation model are decreased by changes to the process parameters of the real system. To improve or expand the control algorithm, it can be provided that, in addition to the modeling or simulation of the transport process, it is also possible to simulate process areas of the production process for the blow-molding of containers which follow the transport process. Additional process areas of the production process can be, for example, the transfer from the transport area to a heating device or the thermal conditioning of the preforms.

An adaptive simulation model is provided by setting up the model to simulate at least one variable of state of the transport method and to compare it with a variable of state of the real transport method. In particular, it can be provided that the simulation model is used within a closed-loop control circuit. It is especially preferable for a simulation model to be set up to be self-learning.

With respect to the adjustment of the process parameters, it is possible, for example, for the rotational speed of the conveying rolls to be adjusted as a process parameter of the sorting device. Alternatively or in addition, it can be provided that a conveying speed is adjusted as a process parameter of the conveying device.

Other process parameters can pertain to a queue brake of the roll conveyor. Additional parameters can pertain to the control of a queue paddle or kicker wheel arranged on the roll conveyor.

In one embodiment of the invention, it can be provided that an ascending conveyor is used as part of the conveying device.

When an ascending conveyor is used, it can be provided that the number of preforms conveyed upward by the ascending conveyor is adjusted by changing the rotational speed of the ascending conveyor. The adjustment can be carried out as a closed-loop control process on the basis of gap data acquired by the section-sensing sensors.

An especially good sensor-based detection of a section of the sorting device can be achieved in that a camera and/or a light grid sensor is used as a section-sensing sensor.

When a light grid sensor is used, it is possible to set up a light curtain created by the light grid sensor on a section of the row of preforms being transported. The optoelectronically produced light curtain can detect the gaps between successive preforms or the end of a preform row. The light curtain of the light grid sensor extending in a plane is preferably oriented in such a way that at least certain parts of the gap between the conveying rolls of the roll conveyor are monitored. Light grid sensors typically consist of a transmitting unit and a receiving unit, wherein a plurality of beam sources arranged in a row in the transmitting unit emit light toward the receiving unit and thus form a close-meshed curtain. The light can be infrared light or laser light, for example. So that the gaps between successive preforms can be detected especially effectively, it is possible for the grid spacing of the light grid sensor to be selected in accordance with the gaps between the preforms. The grid spacing can, for example, be equal to the largest radial diameter of a preform. This makes it possible to detect even the smallest gaps. The absence of a gap can also be detected.

When a camera is used, the camera can be arranged in the area of the sorting device in such a way that at least one contiguous section of the row of preforms being transported is optically detected. The camera can be in the form of a still photo camera and take individual pictures, or it can be a video camera and take continuous moving images. The camera signals can be evaluated continuously and/or at regular intervals for gaps between the transported preforms. So that the preforms can be detected with especially good efficiency, at least some of the sensors configured in particular as light grid sensors or cameras can be aimed upward from underneath, from underneath at an angle, or laterally at a bottom area or at a side wall area of the preforms.

The efficient and accurate control of the process parameters is supported in that, on the basis of the acquired gap data, the gap size and/or gap width between each adjacent pair of successive preforms is determined.

According to the invention, a device for controlling a method for transporting preforms in the area of a blow-molding machine for the blow-molding of containers of thermoplastic material along a sorting device configured as a roll conveyor with two rotating, especially counter-rotating conveying rolls, especially for the control of a method according to the invention is provided, wherein the device is set up to process sensor data from a sensor which senses one section of the sorting device.

For the rapid open-loop or closed-loop control of the method, it can be provided that the device contains a simulation model and/or a fuzzy logic, by means of which at least some of the control signal for the adjustment of the process parameters of the conveying device and/or of the sorting device can be generated on the basis of gap data acquired by the sensor which covers the section.

According to the invention, furthermore, a device for the blow-molding of containers of thermoplastic material with a sorting device configured as a roll conveyor with two rotating, in particular counter-rotating, rolls is provided, wherein, in the area of the sorting device, at least one sensor is arranged, which senses at least one preform being transported within its detection area and generates a sensor signal; wherein the device comprises means for transmitting the sensor signal to a control system; and wherein the control system is set up to evaluate the sensor signal and to generate, as a function of thereof, at least one control signal, by means of which a process parameter of the sorting device and/or of a conveying device installed upstream from the sorting device to feed the preforms to the sorting device can be adjusted; and wherein the device is configured to implement a method according to the invention, wherein at least one of the sensors is set up to sense a section of the sorting device; wherein the sensor signal of this sensor contains data on at least one gap between a pair of successive preforms being transported through the detection area of this sensor; and in that the control system is set up to generate the control signals for adjusting a process parameter of the conveying device and/or of the sorting device for at least certain periods of time as a function of the acquired gap data.

In a preferred embodiment, it is provided that at least one sensor is arranged vertically underneath or at an angle underneath or to the side of the transported preforms. Above the transported preforms, cover-like structures, webs, or the like can be provided on the sorting device which interfere with the contact between the sensor and the preforms. In particular, such structures can interfere with the direct, line-of-sight contact for optical or radiation beam-based measurement methods. In addition, contact can be disturbed by preforms lying in unsorted fashion on top of the transported preforms. It is obvious that, for effective detection of the gaps, several sensors can be provided, each of which in particular is positioned with a different orientation to the transported preforms. It can also be provided that sensor can be provided both above and below and/or to the side of the transported preforms. Also with respect to the method according to the invention, it can be provided that the transported preforms are sensed from underneath, at an angle from underneath, and/or from the side.

A continuous and trouble-free transport of the preforms to the device for the blow-molding of containers can also be supported in that the control system contains a simulation model and/or a fuzzy logic, by means of which at least some of the control signals for the adjustment of process parameters of the conveying device and/or of the sorting device can be generated on the basis of gap data acquired by the sensor covering a certain section.

Variants and embodiments as well as the advantages of the control system according to the invention and of the blow-molding machine according to the invention can be derived from the explanations pertaining to the method according to the invention.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
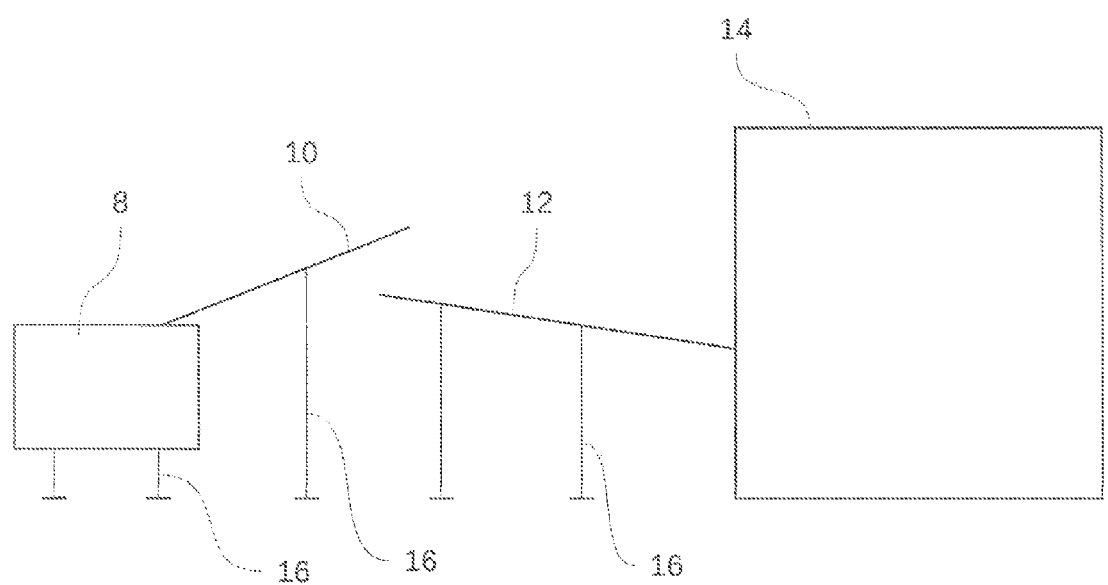
FIG. 1 shows a schematic diagram of a transport section for preforms between a supply container and a blow-molding machine.

FIG. 1 shows a purely schematic side view of a transport section with a conveying device 10 and a sorting device 12, which is positioned downstream in the transport direction from the conveying device 10. Preforms are conveyed from the supply container 8 via the conveying device 10 to the sorting device 12 and then transferred to a blow-molding machine 14 arranged downstream from the sorting device 12. Between the sorting device 12 and the blow-molding machine 14, a slide rail (not shown) can be arranged, which accepts sorted preforms from the sorting device 12 and sends them onward to the blow-molding machine 14. Instead of a slide rail, it is also possible to provide a compressed-air conveying section (not shown).

The conveying device 10 and the sorting device 12 can be installed a certain distance above the floor on support legs 16. To set the angle of the transport device 10 and/of the sorting device 12, the support legs 16 can be height-adjustable. The supply container 8 and/or a slide rail or compressed-air conveying section (not shown) can also be mounted above the floor by means of such support legs 16.

Figure 2:
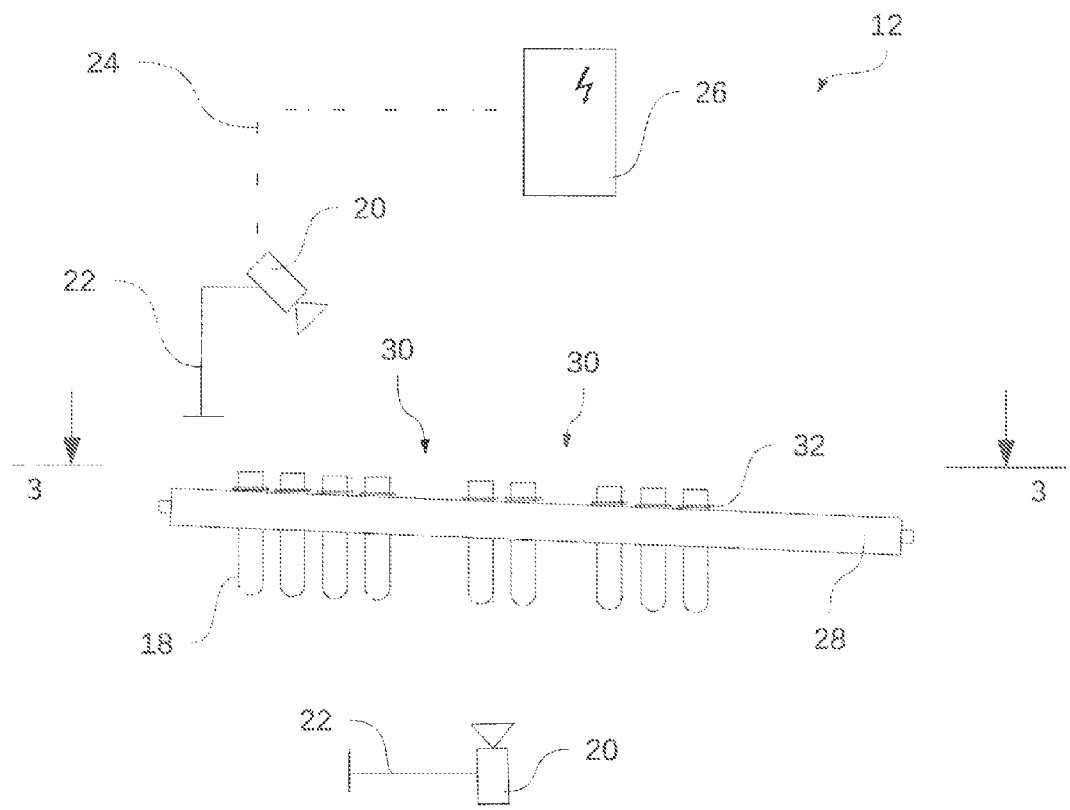
FIG. 2 shows a side view of the two conveying rolls of a roll conveyor and of preforms being transported being the conveying rolls.

FIG. 2 shows a few details of a sorting device 12 configured as a roll conveyor. The sorting device 12 comprises two roller-like conveying rolls 28, which are supported rotatably a certain distance apart on a stand of the sorting device 12. To take advantage of the force of gravity during the transport of the preforms along the conveying rolls or along a slide rail, the sorting device 12 and/or slide rail can be arranged at an angle to the horizontal. The gap between the conveying rolls 28 is set, at least in certain areas, in such a way that the preforms 18 can be transported between the conveying rolls 28 while suspended from their support rings 32. A possible embodiment of a roll conveyor of the type according to the invention is described in, for example, the publication DE 2005 046 508 Al, to which reference is herewith explicitly made.

FIG. 2 shows, by way of example, sensors 20 arranged above and below the sorting device 12, each of which is able to sense a section of a series of preforms 18 being transported between the conveying rolls 28. Alternatively or in addition, it can be provided that at least some of the sensors 20 detect the same section. Each of the sensors 20 is preferably mounted on a stand of the sorting device 12 by means of a bracket 22. For the most trouble-free possible operation of the sensors, the sensors 20 can be arranged vertically underneath the transported preforms 18 and/or at an angle underneath the transported preforms 18. As indicated schematically in FIG. 3, it is possible in addition or alternatively to position at least one sensor 20 laterally next to the preforms 18 being transported.

Sensor data from the sensors 20 can be transmitted via separate or shared transmission routes 24 to a control system 26. In the simplified diagrams in the figures, the transmission route 24 is assigned to only one sensor 20. It is obvious that additional sensors 20 can communicate via separate transmission routes 24 and/or via a shared transmission route 24 with the control system 26. The transmission routes 24 can be hard-wired or wireless.

By means of the sensor 20, gaps 30 in the row of preforms 18 transported between the conveying rolls 28 can be detected. By means of a single measurement, it is possible in particular to detect several gaps 30 simultaneously by one sensor 20. Gaps 30 are to be understood in particular as distances between two successive preforms 18 which exceed a predefined maximum value.

Figure 3:
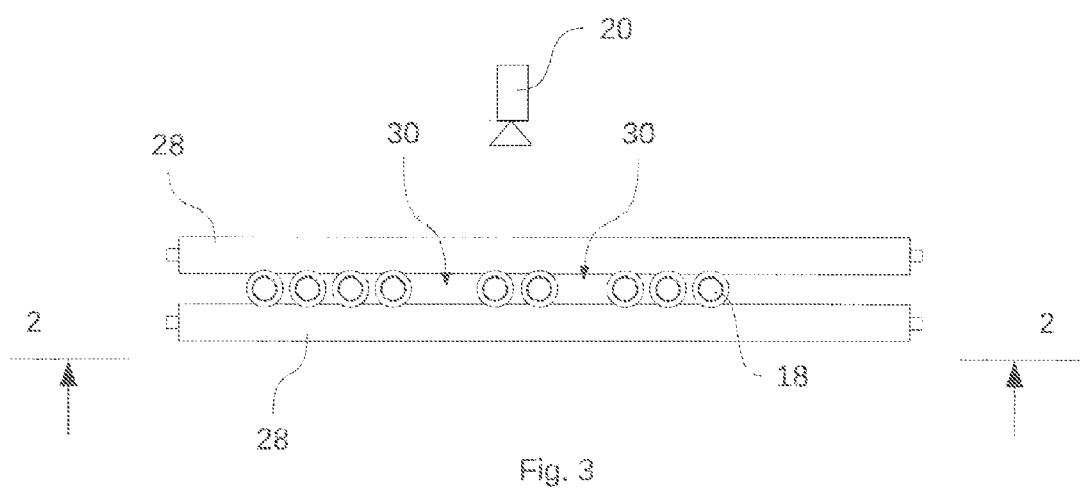
FIG. 3 shows a top view of the conveying rolls with preforms of FIG. 2 being transported between them.

FIG. 3 shows in purely schematic fashion a top view of the conveying rolls 28 of FIG. 2, which are approximately parallel to, and a certain distance from, each other; the preforms 18 being transported between the conveying rolls 28 are also shown. Two gaps 30 between successive preforms 18 can be seen in FIGS. 2 and 3.

On the basis of the sequence of method steps explained by way of example in the following with reference to FIGS. 1-3, preferred substeps of the method according to the invention for transporting preforms 18, starting from a supply container 8 and ending at a blow-molding machine 14, are explained.

An early method step in the transport of the preforms 18 is to provide the preforms 18 in the supply container 8. This container can be filled in bulk with preforms 18. From the supply container 8, the preforms 18 can be transported upward by a conveying device 10 configured as an ascending conveyor for transfer to a sorting device 12, configured as, for example, a roll conveyor. For this purpose, the preforms 18 preferably drop through an opening in the bottom of the supply container 8 onto a conveyor belt of the conveying device 10.

At the end of the conveying device 10, the preforms 18 are transferred to the sorting device 12. The preforms 18 are for this purpose preferably conveyed from the conveying device 10 into a loading hopper (not shown), which guides the preforms effectively into a receiving area of the sorting device 12. In the case of a sorting device 12 configured as a roll conveyor, the preforms 18, while suspended from their support rings 32, are moved along by the force of gravity between two parallel conveying rolls 28, which are arranged at a slant. In the sorting device 12, the unorganized and unoriented preforms 18 are oriented so that they can be sent in orderly fashion to the blow-molding machine 14.

Preforms 18 which are not correctly oriented upon passing through the sorting device 12 configured as a roll conveyor are ejected by a kicker wheel (not shown) arranged in the area of the conveying rolls 28 and/or discharged sideways by means of blast-air nozzles (not shown) onto a return belt (not shown). At the end of the return belt, a preform return unit (not shown) transports the preforms 18 back to the conveying device 10 or into the supply container 8.

As the preforms 18 are being transported along the sorting device 12, at least one sensor 20 communicating with the control system 26 detects the gaps between successive preforms 18 in a certain section of the device. The sensor 20 detects sections of considerable length, so that, on the basis of individual measurements, data on the gaps between the preforms 18 can be evaluated quickly.

If the number of gaps exceeds a predefined value and/or if the gaps between successive preforms 18 are greater than a predetermined value, process parameters of the sorting device 12 and/or of a conveying device 10 upstream from the sorting device 12 are changed. For example, it can be provided that the rotational speed of the conveying rolls 28 is decreased and/or the conveying speed of the ascending conveyor 10 is increased.

In similar fashion, a change in the process parameters can also be provided when too few gaps 30 are detected, i.e., when the number of gaps 30 is below a certain value and/or the gap between successive preforms 18 is smaller than a predetermined value. For example, it can then be provided that the conveying speed of the roll conveyor can be increased by increasing the rpm's of the conveying rolls 28 and/or the conveying rate of the ascending conveyor 10 can be decreased. In addition or alternatively, the braking force of a queue brake arranged in the transport route of the preforms can be increased or decreased.

While specific embodiments of the invention have been shown and described in detail to illustrate the inventive principles, it will be understood that the invention may be embodied otherwise without departing from such principles.

We claim:

1. A method for transporting preforms in an area of a blow-molding machine for blow-molding thermoplastic containers along a sorting device configured as a roll sorter with two rotating conveying rolls, the method comprising the steps of:
    sensing at least one preform with at least one sensor arranged in an area of the sorting device as the preform is transported through a detection area of the sensor, and generating a sensor signal;
    transmitting the sensor signal for processing to a control system that evaluates the sensor signal and generates at least one control signal as a function thereof;
    adjusting a process parameter of the sorting device and/or of a conveying device upstream of the sorting device for supplying preforms to the sorting device as a function of at least one of the control signals; and
    sensing a section of the sorting device with at least one of the sensors, the sensor signal of this sensor containing data on at least one gap between a pair of preforms being transported successively through a detection area of this sensor; wherein
    the control signals for adjusting a process parameter of the conveying device and/or of the sorting device are, at least for certain periods of time, dependent on the gap data.

2. A method according to claim 1, wherein the control system generates at least a few control signals for adjusting process parameters of the conveying device and/or of the sorting device by using a simulation model and/or a fuzzy logic.

3. A method according to claim 1, including adjusting the rotational speed of the conveying rolls as the process parameter of the sorting device.

4. A method according to claim 1, including adjusting a conveying speed as the process parameter of the conveying device.

5. A method according to claim 1, including using an ascending conveyor as part of the conveying device.

6. A method according to claim 1, including using a camera and/or a light grid sensor as a section-sensing sensor.

7. A method according to claim 1, including determining a gap position and/or a gap distance between individual pairs of successive preforms from the gap data.

8. A device for controlling a method according to claim 1 for transporting preforms in an area of a blow-molding machine for blow-molding thermoplastic containers along a sorting device configured as a roll sorter with two rotating conveying rolls, the device comprising: a sensor that senses a section of the sorting device and outputs sensor data; and means for processing the sensor data.

9. A device according to claim 8, wherein the processing means contains a simulation model and/or a fuzzy logic by which at least a few control signals for adjustment of process parameters of a conveying device and/or of a sorting device are generated based on gap data acquired by the section-sensing sensor.

10. A device for blow-molding of containers of thermoplastic material, comprising: a sorting device configured as a roll sorter with two rotating conveying rolls; at least one sensor arranged in an area of the sorting device, and senses at least one preform being transported within a detection area of the sensor and generates a sensor signal; a control system; and means for transmitting the sensor signal to the control system, wherein the control system is set up to evaluate the sensor signal and to generate, as a function of the sensor signal, at least one control signal by which a process parameter of the sorting device and/or of a conveying device upstream from the sorting device for feeding the preforms to the sorting device is adjustable; wherein at least one of the sensors is set up to sense a section of the sorting device, wherein the sensor signal of this sensor contains data on at least one gap between a pair of successive preforms being transported through a detection area of this sensor; and the control system is set up to generate control signals for adjusting a process parameter of the conveying device and/or of the sorting device, at least for certain periods of time, as a function of the gap data.

11. A device according to claim 10, wherein at least one sensor is arranged vertically underneath or at an angle underneath or to a side of the transported preforms.

12. A device according to claim 10, wherein the control system contains a simulation model and/or a fuzzy logic by which at least a few control signals for adjustment of process parameters of the conveying device and/or of the sorting device are generated based on gap data acquired by the sensor covering a certain section.

* * * * *